Feb. 16, 1965 D. S. BAKER 3,169,633
CONVEYOR SEALING MEANS
Filed Dec. 14, 1959 3 Sheets-Sheet 1
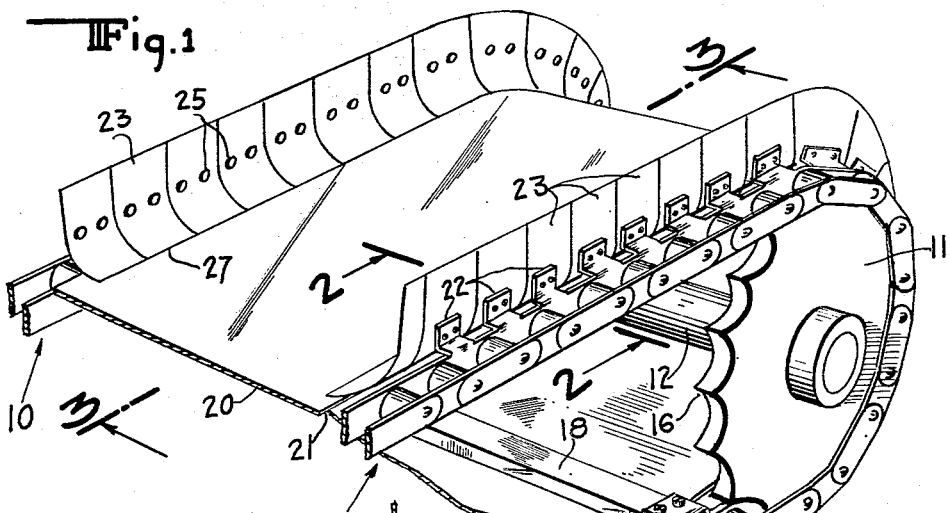
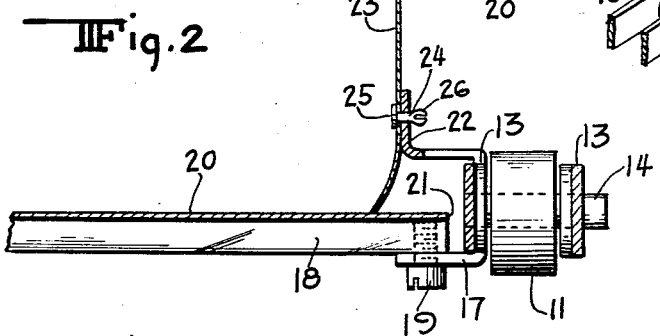
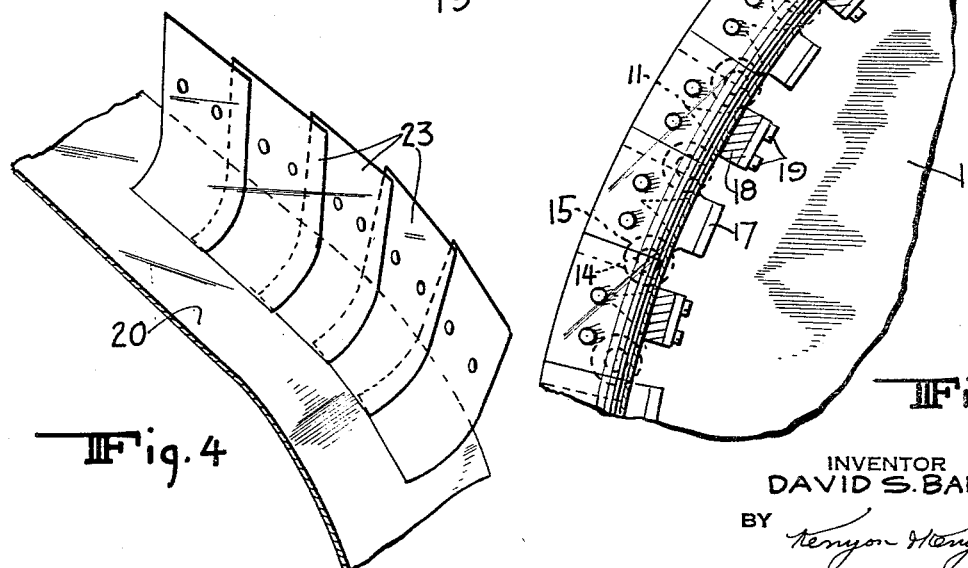
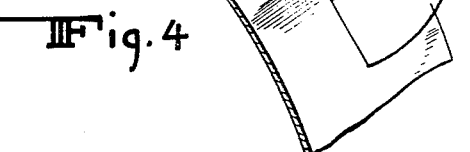
INVENTOR
DAVID S. BAKER
BY
ATTORNEYS

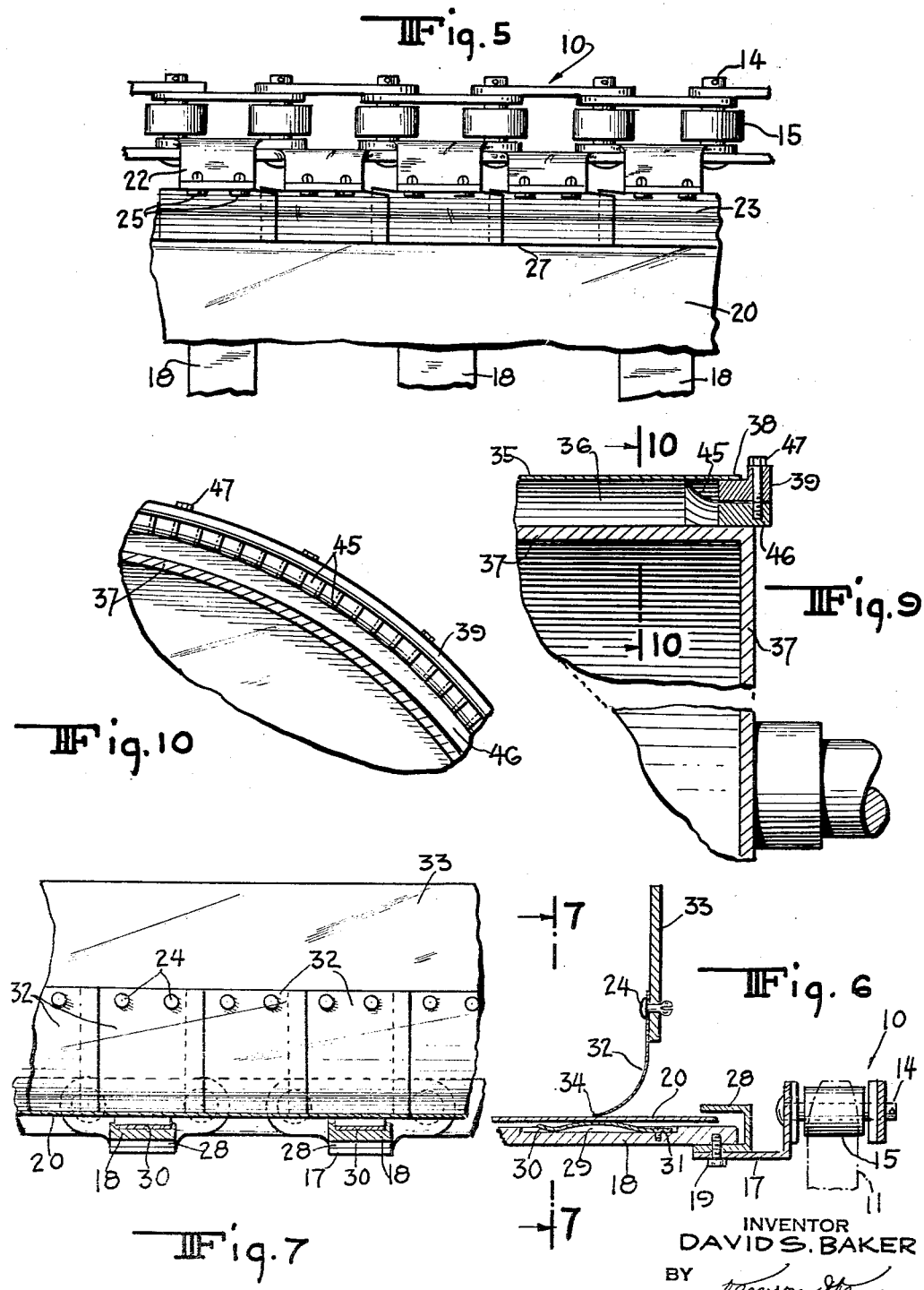

INVENTOR
DAVID S BAKER
BY
ATTORNEYS

United States Patent Office 3,169,633
Patented Feb. 16, 1965

3,169,633
CONVEYOR SEALING MEANS
David S. Baker, 475 5th Ave., New York 17, N.Y.
Filed Dec. 14, 1959, Ser. No. 859,488
12 Claims. (Cl. 198—204)

This invention relates to sealing means and relates more particularly to means for providing a seal with a member mounted for movement in a predetermined line of travel such as orbital travel.

This invention is of particular utility in connection with the confinement of finely divided materials so as to prevent or minimize loss thereof while they are carried on a surface of a belt or drum. In apparatus presenting a moving surface such as the surface of a belt or drum, the matter of confinement along the margins heretofore has presented difficulties. Thus it is usual practice in connection with belt conveyors or the like to have the carrying belt substantially wider than the normal width of the body of material to be conveyed even though substantially additional expense is necessitated in order to provide the belt margins which serve no useful purpose except to minimize loss of material from the margins of the belt.

It is an object of this invention to provide sealing means which is adapted to successfully maintain sealing contact with the surface of a body mounted for movement of the surface along a predetermined line or path of travel such as orbital travel.

A further object of this invention is that of providing sealing means by which a seal may be maintained with a surface traveling in an orbit, the seal means likewise traveling in orbit and maintaining an effective seal during the orbital travel of the surface and of the seal means.

Further more specific objects of this invention relate to increasing the capacity of conveyor belt means with particular reference to the provision of marginal confining means.

Other specific objects of this invention relate to the provision of marginal confining means for the surface of a drum whereby a seal may be maintained between the drum surface and the surface of another member traveling with the drum surface.

Further objects of this invention relate to the provision of improved traveling belt apparatus and more especially to improvements in the type of traveling belt apparatus disclosed in my copending application Ser. No. 638,308, filed February 5, 1957 (now Patent No. 2,946,428) with particular reference to increasing the carrying capacity thereof and to means whereby the sheet metal belt is marginally confined and is so confined as to allow for expansion and contraction of the sheet metal belt due to temperature changes.

A principal feature of this invention resides in the provision of sealing means comprising a succession of pieces of flexible resilient sheet material with free ends thereof constituting an essentially continuous common margin, the pieces being held in relation to a member mounted for movement of its surface along a predetermined line of travel so that the common margin presented by the pieces is disposed in the direction of travel of the surface and the pieces being held in relation to the moving surface so that the continuous common margin presented by the pieces is maintained in resilient contacting relation with the surface.

Further features of this invention relate to the mounting of the individual pieces preferably in successive overlapping relation for movement with a surface having an orbital path of travel whereby a seal is maintained between the pieces and the surface during orbital travel.

It is a feature of certain embodiments of this invention that the succession of pieces of flexible resilient sheet material is mounted for movement with belt means having orbital travel so as to provide a side wall along and adjacent at least one margin of the belt means whereby a seal with the surface of the belt means is provided by the common margin of the succession of pieces that is in resilient pressure contact with the belt surface.

Other features of this invention relate to the disposition of the succession of pieces of flexible resilient sheet material with reference to a drum surface and another surface moving concentrically therewith such as a belt so that the pieces as secured to one of these members present a substantially continuous marginal edge in resilient pressure contact with the surface of the other member effected by the flexure of the pieces whereby a seal may be afforded as, for example, adjacent one or both ends of the surface presented by the drum.

Other features of this invention relate to the provision of a belt such as an endless sheet metal belt which is carried by an endless carrier mounted for orbital travel so that it is resiliently carried by the carrier in a manner which compensates for differences in expansion and contraction occasioned by temperature changes.

Further objects, features and advantages of this invention will be apparent from the following description of certain illustrative embodiments of this invention shown in the accompanying drawings, wherein:

FIG. 1 is a perspective view of one end of an endless carrier which comprises one type of seal means embodying this invention;

FIG. 2 is an enlarged partial cross-section of the carrier shown in FIG. 1 taken on the line 2—2 of FIG. 1;

FIG. 3 is an enlarged partial sectional view of the carrier taken on the line 3—3 of FIG. 1;

FIG. 4 is a perspective partial view with certain of the parts removed showing diagrammatically how the pieces of flexible resilient sheet material accommodate themselves to flexure of the belt and belt carrier shown in FIG. 1;

FIG. 5 is a plan view on an enlarged scale of a portion of the carrier shown in FIG. 1 along a margin thereof;

FIG. 6 is a detail transverse sectional elevation showing another adaptation of the seal means of this invention for providing a seal between a stationary member and a moving member such as a belt, alternative belt supporting means being shown in this figure;

FIG. 7 is a sectional elevation taken on the line 7—7 of FIG. 6 longitudinally of the belt;

FIG. 9 is an enlarged partial sectional view showing the seal means at one end of the drying drum, taken along the line 9—9 of FIG. 8;

FIG. 10 is an enlarged partial section showing the seal means at the end of the drum, FIG. 10 being taken along the line 10—10 of FIG. 9.

Figure 8:
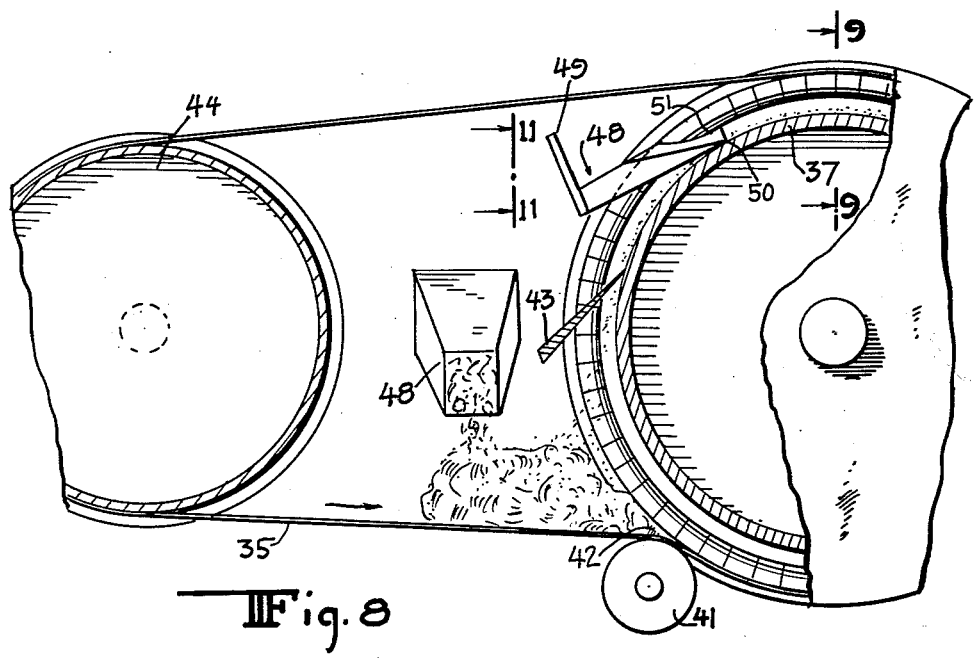
FIG. 8 is a diagrammatic representation of a drum type drying apparatus wherein the seal means embodying this invention is employed for providing a seal between the drum surface and a belt moving concentrically with the drum surface.
Figure 11:
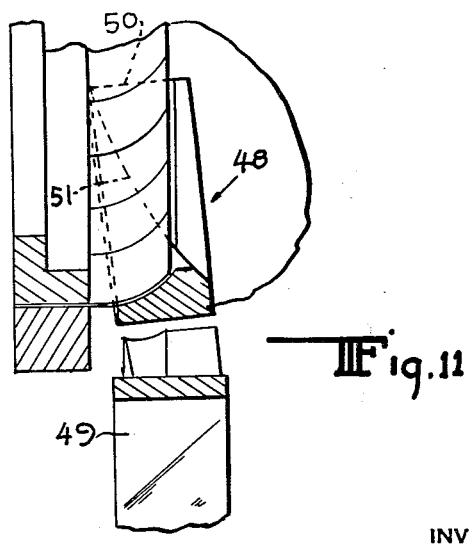
FIG. 11 is a detail view on an enlarged scale showing a cleaning device for cleaning the flexible resilient pieces of sheet material which provide the seal means of the embodiment shown in FIG. 8.

The sealing means of this invention as shown in FIGS. 1–5 is embodied in a traveling belt apparatus of the type disclosed in my aforesaid application Ser. No. 638,308. In this traveling belt apparatus a continuous flexible belt carrier or cradle is employed which is mounted for travel in an orbit. An endless flexible belt means is carried by the belt carrier in laterally slidable relation therewith and guide means provided by the belt carrier is in proximate abutting relation to the opposite margins of the belt means for limiting the lateral sliding movements of the belt means relative to the carrier.

In the embodiment as shown in the drawings the traveling carrier comprises a pair of sprocket chains 10 which are carried by a pair of sprocket wheels 11 mounted for rotation about the axis of the rotatable shaft 12. Another pair of sprocket wheels (not shown) similarly rotatably mounted for rotation about an axis in spaced parallel relation to the axis of the rotatable shaft 12 may be employed to complete the endless orbital travel if the belt carrier and the belt. The pair of sprocket wheels 11 may be driven from a suitable source of power (not shown) for effecting travel of the sprocket chains in the same direction and at the same rate.

Each of the sprocket chains 10 is composed of a succession of links 13 which are pivotally connected for articulation about a succession of transverse parallel axes by means of the pins 14 between the links. The rollers 15 disposed about the pins 14 provide spacing means between the links forming the opposite sides of each chain and likewise provide anti-friction rolling contacts with the teeth 16 presented by the sprocket wheels.

Along each of the sprocket chains 10 there is a succession of laterally disposed offset lugs 17 which in the embodiment shown are integral with a succession of spaced links 13. A succession of crossbars 18 extend transversely from one chain to the other and are secured to the lugs 17 by some suitable means such as screws 19. The number of crossbars that is employed depends upon the dimensions of the traveling belt apparatus and the load to be supported by the belt. Ordinarily it is not necessary to employ a crossbar for every link of the sprocket chains. It is usually sufficient to attach a crossbar at intervals such as every fourth, fifth or sixth link of the sprocket chains. However, the number of crossbars employed in any given installation may be readily adjusted as desired. Thus when great supporting strength is desired a crossbar may be provided at every or every other link. On the other hand, for carrying light materials the crossbars may be attached at relatively nonfrequent intervals. The fact that the crossbars may, if desired, be provided in closely spaced relation to each other has advantages in connection with the employment of the sealing means of this invention inasmuch as the sealing means enables the load carrying capacity of a given belt to be increased several times without risk of spilling from the side margins of the belt. In FIG. 3 the crossbars 18 are shown attached to every other link, thereby providing an extremely strong supporting carriage for the belt 20. While crossbars generally are desirable, nevertheless for relatively small installations, or when the belt is composed of relatively strong structural material such as sheet steel, the crossbars 18 may be omitted altogether, the belt 20 merely being supported at its margins by the lugs 17.

The belt 20 which serves the function of a traveling support may be in the form of a continuous band of a material such as stainless steel, although other materials such as fabric impregnated with rubber or the like may be used. The continuous band may be provided from a continuous sheet by shaping the sheet into a band and joining the ends as by welding or rivets in the case of metal, or stitching or other seam in the case of fabric. However, due to the special way by which the belt is carried it is possible for some installations merely to have the ends of the continuous sheet overlapping without being joined together by mechanical securing means.

The opposite margins 21 of the belt are spaced somewhat from the sides of the links adjacent the belt so as to allow for substantial movement of the belt 20 laterally with respect to the belt carriage throughout the entire length of the belt, the inner margins of the links providing guide means in proximate abutting relation to the opposite margins of the belt for limiting the lateral sliding movements of the belt relative to the belt carriage.

The traveling belt apparatus as described thus far is of the type disclosed in my aforesaid application and the sealing means of this invention is preferably employed with such traveling belt apparatus although the sealing means of this invention has more general applications to other traveling belt apparatus and in other relationships with relatively moving parts, as has been mentioned hereinabove.

In the embodiment of this invention as shown in FIGS. 1–5 each of the links 13 of the sprocket chains on the sides thereof facing the belt have a lug 22 upstanding therefrom and there is secured to each of these lugs a piece 23 of flexible resilient sheet material such as thin sheet steel. The pieces 23 are secured to the lugs 22 in upstanding relation relative to the belt 20 by any suitable securing means. Preferably the securing means is such as to be readily removable so that the pieces 23 may be removed and replaced very readily. One such readily removable securing means is that shown most clearly in FIG. 2, namely, a rivet 24 having a retaining head 25 and a split friction head 26. Such a rivet or snap fastener may be put in place merely by inserting the friction head through holes in the pieces 23 and in the lugs 22 which are adapted for frictionally receiving the head 26.

Each of the pieces 23 when in unsecured free relation is normally flat. However, the securement of the pieces to the lugs 22 is such that the pieces are flexed substantially by reason of the closeness of the spacing of the pieces with respect to the surface of the belt 20. The pieces preferably are substantially overlapped from link to link of each sprocket chain and present a substantially continuous common lower margin that is maintained in resilient pressure contact with the surface of the belt along the margin thereof that is effected by the flexure of the pieces and by their inherent resiliency when flexed. The pieces 23 do not necessarily have to be flat when in their free and unsecured condition inasmuch as the portions thereof providing the continuous common margin contacting the belt may be somewhat curved. However, the setting of the pieces is such that there is at least some flexure of the pieces as compared with the conformation of the pieces in their free and unsecured condition whereby the resilient pressure contact is maintained. The degree of pressure maintained depends, of course, upon the force required for accomplishing the flexure to which the pieces are subjected when in secured position and this pressure may be predetermined by the selection of the material used for the pieces 23 and by the extent to which they are caused to be flexed.

It is to be noted that the substantially continuous common margin 27 provided by the pieces 23 provides a sealing edge with the belt 20 not only along the linear reach of the belt but also during travel of the belt when the sprocket chains pass over the sprocket wheels 11. The manner of relative adjustment of the pieces 23 under such conditions is indicated diagrammatically in FIG. 4. While the marginal edge of each piece may become slightly separated from the surface of the belt adjacent each side margin of each piece, this spacing in a normal installation is extremely slight and does not interfere with the virtually complete retention of a material being carried on the belt so as to prevent it from escape along the side margins of the belt even during arcuate travel of the belt.

In the embodiment shown, the pieces 23 not only provide a seal but in themselves provide a side wall which moves with the belt. As mentioned hereinabove, it has been common practice in connection with belt conveyors to provide belts substantially wider than the width of the material placed on the carrier to be transported thereby so as to prevent loss by spillage over the belt margins.

It is apparent that by the employment of this invention the entire belt width may be utilized for supporting material to be carried. Moreover, the material to be carried may be piled to substantial height on the belt even along the belt margins, with the result that the capacity of an installation of a given size may be increased several times by the employment of this invention. Of course, the heighth to which the pieces 23 extend upwardly from the belt surface may be predetermined by the selection of the size of the pieces for a given installation.

Another advantage of the embodiment of this invention shown in FIGS. 1–5 is that the pieces 23 resiliently hold the belt 20 against the crossbars 18 or other supporting element of the belt carrier. This is desirable in that a better control is provided for the position of the belt 20 relative to the belt carrier. Moreover, the pieces serve the additional function of providing a support for the belt during travel along the lower reach of the conveyor and in the event of expansion of the belt 20 relative to the belt carrier the resiliency of the pieces 23 permits such expansion.

While the sealing means of this invention has been shown embodied in a traveling belt apparatus of the type disclosed in my aforesaid copending application, the sealing means of this invention also is advantageous when utilized in connection with other types of traveling belt apparatus. Thus the belt 20 instead of being in unsecured relation to a belt carriage may have its opposite margins secured to the members, such as sprocket chains, mounted for orbital travel. In this case also this invention may be advantageously utilized to provide confining and sealing means along and adjacent the margin of an endless carrier such as a belt. Moreover, the succession of pieces 23 may be secured to support means other than in the particular manner shown and however the support means may be caused to move in contiguous relation with a margin of the endless conveyor belt during at least a portion of travel thereof.

In FIGS. 6 and 7 the sealing means of this invention is shown for providing a seal between a stationary member and the surface of a movable member. In this embodiment the traveling belt apparatus may be essentially the same as that hereinabove described in connection with FIGS. 1–5 comprising sprocket chains 10 mounted on sprocket wheels 11, the links 13 of the sprocket chains 10 having the supporting lugs 17 to which the crossbars 18 are secured by the screws 19. However, in this embodiment the screws 19 also serve to secure the U-shaped members 28 to the lugs 17, the U-shaped members 28 being utilized to retain the belt 20 when traveling along its lower reach and to limit lateral movements of the belt 20 relative to the support bars 18. In this figure the support bars 18 are shown as having a recess 29 therein in which there is disposed a spring member 30 which is secured at one end thereof to the crossbar 18 as by screw 31. The central portion of the spring member 30 normally projects above the level of the upper surface of the crossbar 18 and the belt 20 therefore rests on the spring member 30 which provides a resilient support therefor. Such spring members may be provided for each of the crossbars adjacent each margin thereof and, if desired, likewise at intervals along the longitudinal extent of the crossbars 18. In this way a resilient support for the belt 20 is provided which is capable of absorbing a substantial amount of contraction of the belt 20 relative to the carrier bars 18 if such were to occur as, for example, as the result of temperature changes. Such springs 30 may likewise be utilized in the embodiment shown in FIGS. 1–5 and in such case the belt 20 is resiliently held between the springs 30 and the common margin presented by the pieces 23 that is maintained in resilient pressure contact with the belt 20.

In the embodiment shown in FIGS. 6 and 7 the succession of pieces 32 which provide the sealing means, instead of moving with the belt, is secured to a stationary wall member 33. The pieces 32 as secured to the stationary wall member 33 provide a substantially continuous common margin 34 that, as in the embodiment previously described, is maintained in resilient pressure contact with the belt 20 effected by the flexure of the pieces 32. The embodiment shown in FIGS. 6 and 7 is less desirable than the embodiment shown in FIGS. 1–5 from the standpoint of the friction which results from the movement of the belt relative to the margin 34 of the pieces 32. However, when the belt is made of sheet steel and the pieces 32 likewise are made of sheet steel, the wearing of the parts is very gradual. Moreover, by employing readily removable securing fasteners 24 the pieces 32 may be readily replaced whenever desired. When the pieces 32 are thus secured to a stationary wall or other member 33, the employment of the succession of overlapping pieces permits the seal to be maintained not only along the linear reach of the conveyor, but also along the arcuate portions of the travel of the conveyor. The embodiment such as that shown in FIGS. 6 and 7 is particularly desirable when the wall 33 is of substantial height as, for example, in providing an enclosed space above the conveyor. One example of such an application of the sealing means of this invention is disclosed in my copending application Ser. No. 501,087, filed April 13, 1955 (now Patent No. 2,954,613). As shown in said copending application, the belt means with which the sealing means of this invention may be utilized is constructed and mounted in a manner suitable for a relatively large scale drier that is substantially different in construction from the traveling belt apparatus shown in FIGS. 6 and 7. Instead of mounting the succession of pieces 32 on the stationary wall member 33, the relationship may be reversed, namely, the succession of pieces may be secured to the belt or belt carrier, e.g., to the successive chain links 13, so as to provide a continuous common margin maintained in resilient pressure contact with a stationary part such as the wall member 33. More generally, the sealing means of this invention is adapted for employment with any type of traveling belt apparatus for providing a seal with respect to a traveling belt or other member mounted for orbital travel.

The sealing means of this invention likewise may be utilized for providing a seal between the surface of a drum and a member, such as a belt traveling concentrically with the drum surface, as disclosed in FIGS. 8–11. In these figures the sealing means is disclosed for use in connection drum type drying apparatus of the type disclosed in my aforesaid copending application Ser. No. 501,087. In FIG. 8 this type of drying apparatus is disclosed merely in elemental diagrammatic form and only those details which are applicable to the present invention have been shown in detail in FIGS. 9, 10 and 11. In my said application Ser. No. 501,087 the details of the drying apparatus as a whole are described in detail, including the sealing means.

The drying apparatus shown diagrammatically in FIG. 8 comprises belt means 35 which is mounted for orbital travel, a portion of said orbital travel being concentric with the drying surface 36 of the drying drum 37. The margins 38 of the belt are supported by the flange 39 so that the inner surface of the belt 35 is held in spaced relation with respect to the drying suface of the drying drum. Material to be dried is fed into the drier through the feeding device 40 onto the upper surface of the lower reach of the belt 35. The belt 35 is guided over the guide roll 41 so as to provide a throat 42 into which the material is taken so as to become sandwiched between the peripheral surface of the drum and the inner surface of the belt which travels in the direction shown by the arrow. The material is carried to the top of the drum and, while being so carried, is heated by heat transferred through the drum from a suitable means for supplying heat in the interior of the drum. The heated material is scraped from the surface of the drum by the scraper 43 and is permitted to fall onto the lower reach of the belt again for another passage into the arcuate confined space between the drum and the belt. If the material to be dried is supplied adjacent one side of the belt, it gradually works to the other side of the belt where it may be discharged in wholly or partially dried condition as disclosed in my aforesaid application Ser. No. 501,087. The belt means is shown merely as a simple band in FIGS. 8–12 but may be made up of sections with reinforcing bars, as disclosed in detail in my aforesaid application Ser. No. 501,087. The portion of the belt 35 which provides a loop wherein the belt 35 becomes more removed from the surface of the drum so as to provide a drying chamber may be supported by any suitable means such as a rotatably mounted drum 44, or rotatably mounted discs, or sprocket wheels when the belt is carried between sprocket chains as disclosed in my aforesaid application Ser. No. 501,087.

In drying apparatus of the character above described it is important to provide an effective seal between the peripheral surface of the drum and the inner surface of the belt adjacent the drum margins. The sealing means of this invention is adapted to provide such a seal. Thus, as best shown in FIGS. 9 and 10, there is a succession of overlapping pieces 45 of flexible sheet material which is held between the flange member 39 and the band 46 which may be secured in place by means of the screws 47. The pieces 45 are preferably made of spring steel which are tempered in permanently curved shape to a somewhat greater extent than the curvature indicated in FIGS. 9 and 10. Thus when the belt 35 is placed in the position shown the inwardly directed ends of the pieces 45 which fall along a substantially continuous common line or margin are bent downwardly against the resilient resistance to deformation that is inherent in the material of which the pieces 45 are fabricated. Accordingly, the common margin of the pieces 45 is maintained in resilient pressure contact with the inner surface of the belt 35 effected by flexure of the pieces 45.

In order to remove material which may become packed between the resilient pieces 45 and the peripheral surface of the drum 37, a scraper finger 48 is held by suitable means such as the support bar 49 so as to extend upwardly. The upper end of the finger 48 is provided with two scraping edges 50 and 51. The scraping edge 50 scrapes material from the heated surface of the drum and the scraping edge 51 projects under the pieces 45 and scrapes material from the under surface thereof and from the band 46. The surface 51 likewise is contoured so as to provide a cam surface over which the pieces 45 pass which functions to maintain the pieces 45 properly shaped for renewed resilient pressure contact of the end margins thereof with the interior surface of the belt.

While the sealing means of this invention has been shown in FIGS. 8–11 as embodied in one type of drier, it is apparent that the seal may be utilized with other types of drier, such as one wherein both the drum and the belt are foraminous for passage of a drying gas through the material while it is sandwiched between the drum surface and the belt. Moreover, the belt may have other paths of orbital travel such as that illustrated in FIG. 8, for example, disclosed in my Patent No. 2,412,763.

While reference has been made to the employment of pieces comprised of resilient sheet metal such as sheet steel, other flexible resilient sheet materials may be employed. Thus various sheet plastics may be employed, many suitable for the purpose being well known; and the plastic may be employed either alone or with reinforcement such as a fabric of woven strands or of unspun fibers. The material selected will depend largely upon the size and nature of the installation with which the sealing means is used and on the nature of the material with which it is to come in contact. The size of the pieces may be varied. Ordinarily the width of the pieces, i.e., their dimension in the direction of the succession, may be from about 1 to 3.5 inches depending on the size of the installation. In the case of a belt whose width is of the order of 1.5 to 2 feet that utilizes sprocket chains made of links articulated about pins spaced apart by about 1.5 inch and intended for passage over sprocket wheels about 2 feet in diameter, pieces about 1.75 inch in width secured to each link with a substantial overlap provide a very desirable marginal seal for the belt. The pieces in such case also may be about 1.75 inch in height but the height may be less or substantially greater.

While this invention has been described in connection with certain specific embodiments thereof, it is to be understood that this has been done for illustrative purposes and that the construction of the parts may take different forms for effecting the objects and realizing the features of this invention that have been described and exemplified herein.

This application is a continuation-in-part of my application Ser. No. 501,087, filed April 13, 1955.

I claim:

1. A carrier which comprises an endless belt and mounting means for mounting said belt for travel in an orbit and which has in combination therewith a side wall disposed along and adjacent at least one margin of said belt, said side wall comprising a succession of overlapping pieces of flexible resilient sheet material presenting a common, substantially linear margin, elongated support means adapted and mounted for travel in contiguous relation with respect to said margin of said belt through at least a portion of said orbital travel of said belt, and means securing said pieces to said support means with said linear margin of said pieces in resilient pressure contact with said belt effected by flexure of said pieces.

2. Traveling belt apparatus comprising a continuous flexible belt carrier, means for mounting said carrier for travel in an orbit, endless flexible belt means carried by said belt carrier in laterally slidable relation therewith, guide means secured to said belt carrier in proximate abutting relation to the opposite margins of said belt means for limiting the lateral sliding movements of said belt means relative to said carrier, a succession of pieces of flexible sheet material secured to said belt carrier along and adjacent a margin of said belt means and in upstanding relation with respect to said belt means, said pieces presenting a substantially continuous common margin resiliently held in pressure contact with said belt means by flexure of said pieces.

3. Traveling belt apparatus according to claim 2 wherein said endless flexible belt means is a sheet metal belt and wherein said pieces of flexible resilient sheet material are pieces of thin sheet steel.

4. Taveling belt apparatus comprising a continuous flexible belt carrier, means for mounting said carrier for travel in an orbit, an endless sheet metal belt carried by said carrier in laterally slidable relation therewith, guide means secured to said belt carrier in proximate abutting relation to the opposite margins of said belt, and resilient spring means underlying said belt and interposed between said belt and said carrier for resiliently supporting said belt on said carrier.

5. Traveling belt apparatus according to claim 4 which comprises resilient means secured to said carrier and overlying said belt for retaining said belt.

6. Traveling belt apparatus which comprises a pair of equi-length continuous chains comprising a succession of links pivotally connected for articulation about spaced transverse parallel axes, means for mounting said chains for travel of said axes in the same direction in spaced parallel orbits, a succession of belt-carrying members secured to said links of said chains in oppositely disposed relation, belt means carried by said belt-carrying members, and pieces of flexible resilient sheet material secured in successive overlapping relation, respectively, to a succession of said links in upstanding relation with respect to said belt means along and adjacent a margin thereof, said pieces presenting a substantially continuous common margin thereof in resilient pressure contact with said belt means effected by flexure of said pieces.

7. Traveling belt apparatus which comprises a pair of equi-length sprocket chains comprising a succession of links pivotally connected to each other adjacent the ends thereof for articulation about transverse axes, means comprising at least one pair of coaxial sprocket wheels in spaced parallel planes over which said sprocket chains, respectively, pass for mounting said chains for travel of said axes in the same direction in spaced parallel orbits, belt means adapted for orbital travel, means attached to said links of said chains for carrying said belt for travel substantially in said orbit, lugs secured, respectively, to said links, and a succession of pieces of flexible resilient sheet material secured, respectively, to said lugs in upstanding relation with respect to said belt means adjacent a margin thereof with the portions thereof adjacent said belt disposed along a substantially common margin in resilient pressure contact with said belt effected by flexure of said pieces.

8. Traveling belt apparatus according to claim 7 wherein said pieces are secured to said lugs by readily releasable securing elements.

9. Sealing means for providing a seal between a surface of a drum member and a concentric adjacent surface of another member which comprises a succession of lapped pieces of flexible resilient sheet material secured to one of said members along the periphery of a circle in a plane substantially normal to the axis of said drum with free ends thereof disposed substantially along a common arcuate line in resilient contacting relation with the adjacent surface of the other member.

10. Apparatus for treating material including a rotary drum mounted to rotate on a generally horizontal axis and having a material-receiving outside surface, means forming an endless belt having a portion concentrically surrounding a portion of the outside surface of said drum in proximate spaced relation to said surface of said drum and a portion directed so as to become substantially more removed from said surface of said drum, means for rotating said drum and moving said endless belt means for movement in the same direction during the concentric travel of said surface and said belt, and seal means for providing a seal at least at one end of said drum between said portion of said surface of said drum and said portion of said endless belt means concentrically surrounding said portion of said drum, said seal means comprising an annular succession of overlapping pieces of flexible resilient sheet material secured to said drum adjacent said end thereof so as to extend inwardly from said end of said drum with the inner extremities thereof resiliently contacting the inner surface of said endless belt means where it is disposed concentrically surrounding said portion of said drum.

11. Apparatus for drying material including a rotary drum mounted to rotate on a generally horizontal axis and having a material-receiving outside surface, means forming an endless conveyor belt having a portion concentrically surrounding a portion of the outside surface of said drum and a material-feeding portion which approaches said drum surface generally tangentially, means for rotating said drum and said endless conveyor belt means in the same direction to sandwich material between the outside surface of said endless conveyor belt means and to carry said material on said drum, means for removing so-called material from the outside surface of said drum and causing the removed material to be placed upon the material-feeding portion of said endless conveyor belt means, means for feeding material to be dried onto said material-feeding portion of said endless conveyor belt means adjacent one end of said drum, and seal means for providing a seal at and along the circumference of said drum adjacent said end thereof between said portion of said drum and said portion of said endless conveyor belt means concentrically surrounding said portion of said drum, said seal means comprising an annular succession of overlapping pieces of flexible resilient sheet material secured to said drum adjacent said end thereof so as to extend inwardly from said end of said drum with the inner extremities thereof resiliently contacting the inner surface of said endless conveyor belt means where it is disposed concentrically surrounding said portion of said drum.

12. Apparatus according to claim 11 which comprises a fixedly held cleaning member with which said pieces of flexible resilient material during rotation of said drum come in contact after their separation from said resiliently contacting relation with said inner surface of said endless conveyor belt means whereby material clinging thereto is scraped therefrom.

References Cited in the file of this patent
UNITED STATES PATENTS

| | | |
|---|---|---|
| 1,422,002 | Shaw | July 4, 1922 |
| 1,801,906 | D'Humy et al. | Apr. 21, 1931 |
| 2,355,879 | MacFarlane et al. | Aug. 15, 1944 |
| 2,665,795 | Holwick | Jan. 12, 1954 |
| 2,795,316 | Borrowdale | June 11, 1957 |
| 2,928,523 | Neidhart | Mar. 15, 1960 |